(12) United States Patent
Vadlakonda et al.

(10) Patent No.: US 8,345,851 B2
(45) Date of Patent: Jan. 1, 2013

(54) RANDOMIZED DIGIT PROMPTING FOR AN INTERACTIVE VOICE RESPONSE SYSTEM

(75) Inventors: Sravan Vadlakonda, Sunnyvale, CA (US); Shantanu Sarkar, San Jose, CA (US); Aseem Asthana, San Jose, CA (US); Ashish Chotai, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1498 days.

(21) Appl. No.: 11/443,993

(22) Filed: May 31, 2006

(65) Prior Publication Data

US 2007/0280456 A1    Dec. 6, 2007

(51) Int. Cl.
*H04M 3/42* (2006.01)
(52) U.S. Cl. .................. 379/207.13; 704/273; 713/155
(58) Field of Classification Search .... 379/88.01–88.24; 713/151–186; 704/273
See application file for complete search history.

(56) References Cited

U.S. PATENT DOCUMENTS

| | | | |
|---|---|---|---|
| 4,805,210 A | | 2/1989 | Griffith, Jr. |
| 5,206,905 A | * | 4/1993 | Lee et al. ................. 705/55 |
| 5,432,844 A | | 7/1995 | Core et al. |
| 5,608,786 A | | 3/1997 | Gordon |
| 5,615,213 A | | 3/1997 | Griefer |
| 5,794,218 A | | 8/1998 | Jennings et al. |
| 5,905,448 A | * | 5/1999 | Briancon et al. ........... 340/7.43 |
| 5,937,040 A | | 8/1999 | Wrede et al. |
| 5,999,599 A | | 12/1999 | Shaffer et al. |
| 6,044,081 A | | 3/2000 | Bell et al. |
| 6,259,405 B1 | | 7/2001 | Stewart et al. |
| 6,271,764 B1 | | 8/2001 | Okamura |
| 6,298,324 B1 | * | 10/2001 | Zuberec et al. ............... 704/251 |
| 6,421,544 B1 | | 7/2002 | Sawada |
| 6,438,600 B1 | | 8/2002 | Greenfield et al. |
| 6,522,726 B1 | * | 2/2003 | Hunt et al. ................. 379/88.04 |
| 6,526,293 B1 | | 2/2003 | Matsuo |
| 6,542,583 B1 | * | 4/2003 | Taylor ........................ 379/88.02 |
| 6,545,596 B1 | | 4/2003 | Moon |
| 6,564,261 B1 | | 5/2003 | Gudjonsson et al. |
| 6,587,680 B1 | | 7/2003 | Ala-Laurila |
| 6,643,774 B1 | | 11/2003 | McGarvey |
| 6,654,455 B1 | | 11/2003 | Isaka |
| 6,769,000 B1 | | 7/2004 | Akhtar et al. |

(Continued)

OTHER PUBLICATIONS

Wise Geek, What is IVR?, May 12, 2006. 2 pages.*

(Continued)

*Primary Examiner* — Yuwen Pan
*Assistant Examiner* — Assad Mohammed
(74) *Attorney, Agent, or Firm* — Baker Botts LLP

(57) ABSTRACT

A system and method that provides a user with the ability to transmit confidential information to an IVR system in a secure manner includes invoking an interactive voice response (IVR) routine, the IVR routine determining each of the digits in the sequence by making successive queries and/or digit guesses. A user of the voice communication device need only make an affirmative response or a negative response to each query or digit guess. Once determined, each of the digits in the sequence is sent to the destination system. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

18 Claims, 4 Drawing Sheets

Script 31:
- IVR System: Is the 1st digit 5 or less?
- User: Yes
- IVR System: Is it 2 or more?
- User: No
- IVR System: Is it 1?
- User: Yes
- IVR System: Is the 2nd digit 5 or less?
- User: No
- IVR System: Is it 8 or less?
- User: Yes
- IVR System: Is it 6?
- User: Yes
- IVR System: We have 1, 6; is the 3rd digit 5 or less?
- User: Yes
⋮

U.S. PATENT DOCUMENTS

| | | | |
|---|---|---|---|
| 6,792,296 B1 | 9/2004 | Van Bosch | |
| 6,792,297 B2 | 9/2004 | Cannon et al. | |
| 6,798,874 B1 | 9/2004 | Ohlinger et al. | |
| 6,799,052 B2 | 9/2004 | Agness et al. | |
| 6,804,334 B1 | 10/2004 | Beasley et al. | |
| 6,816,469 B1 | 11/2004 | Kung et al. | |
| 6,839,761 B2 | 1/2005 | Kadyk et al. | |
| 6,847,715 B1 | 1/2005 | Swartz | |
| 6,870,835 B1 | 3/2005 | Chen et al. | |
| 6,876,734 B1 | 4/2005 | Summers et al. | |
| 6,905,414 B2 | 6/2005 | Danieli et al. | |
| 6,907,123 B1 | 6/2005 | Schier | |
| 6,912,275 B1 | 6/2005 | Kaplan | |
| 6,917,672 B2 | 7/2005 | Brown et al. | |
| 6,918,034 B1 | 7/2005 | Sengodan et al. | |
| 6,931,001 B2 | 8/2005 | Deng | |
| 6,934,858 B2 | 8/2005 | Woodhill | |
| 6,947,417 B2 | 9/2005 | Laursen et al. | |
| 6,985,745 B2 | 1/2006 | Quaid | |
| 6,987,744 B2 | 1/2006 | Harrington et al. | |
| 7,209,549 B2 * | 4/2007 | Reynolds et al. | 379/88.05 |
| 7,466,801 B2 * | 12/2008 | Miller et al. | 379/88.06 |
| 7,694,138 B2 * | 4/2010 | O'Gorman et al. | 713/168 |
| 2002/0010008 A1 | 1/2002 | Bork et al. | |
| 2002/0068537 A1 | 6/2002 | Shim et al. | |
| 2002/0086680 A1 | 7/2002 | Hunsinger | |
| 2002/0178228 A1 | 11/2002 | Goldberg | |
| 2002/0198004 A1 | 12/2002 | Heie et al. | |
| 2003/0061496 A1 | 3/2003 | Ananda | |
| 2003/0126010 A1 * | 7/2003 | Barns-Slavin | 705/10 |
| 2004/0131206 A1 | 7/2004 | Cao et al. | |
| 2004/0248586 A1 | 12/2004 | Patel et al. | |
| 2005/0157708 A1 | 7/2005 | Chun | |
| 2005/0177622 A1 | 8/2005 | Spielman et al. | |
| 2005/0272413 A1 | 12/2005 | Bourne | |
| 2005/0273333 A1 * | 12/2005 | Morin et al. | 704/247 |
| 2006/0034336 A1 | 2/2006 | Huh et al. | |
| 2006/0116175 A1 | 6/2006 | Chu | |
| 2006/0206454 A1 * | 9/2006 | Forstall et al. | 707/3 |

OTHER PUBLICATIONS

Sid J. Schneider, Pretesting Interactive Voice REsposne/Autmated Speech Recognition Surveys, Nov. 14-17, 2002. pp. 17.*

How to Build Smart Appliances, Albercht Schmidt, Kristof Van Laerhoven, IEEE Personal Communications, Aug. 2001, pp. 66-71.

* cited by examiner

Script 31
{
IVR System: Is the 1st digit 5 or less?
User: Yes
IVR System: Is it 2 or more?
User: No
IVR System: Is it 1?
User: Yes
IVR System: Is the 2nd digit 5 or less?
User: No
IVR System: Is it 8 or less?
User: Yes
IVR System: Is it 6?
User: Yes
IVR System: We have 1, 6; is the 3rd digit 5 or less?
User: Yes

RANDOMIZED DIGIT PROMPTING FOR AN INTERACTIVE VOICE RESPONSE SYSTEM

FIELD OF THE INVENTION

The present invention relates generally to the field of interactive voice response (IVR) systems; more specifically, to methods and apparatus for providing or inputting confidential information to an IVR system in a secure manner.

BACKGROUND OF THE INVENTION

Electronic transactions over telephone networks or via the Internet are commonplace today. For example, electronic commerce over the Internet often involves an individual providing credit card information to a secure server using, e.g., DTMF (Dual Tone Multi-Frequency) communication, voice dialogs with either a machine, e.g., an IVR system or human operators. A graphical user interface (GUI) on a personal computer (PC) or other optical interfaces (e.g., touch-screens) may also be used to provide confidential information over a telephone or other network connection. Another common example is when a caller is asked to enter his social security number or other personal identification number (e.g., password/PIN, login, etc.) over the telephone or an internet connection.

Unfortunately, these methods potentially allow someone else to secretly acquire this information and use it for their own nefarious purposes. By way of example, providing secure information using speech input renders an IVR application useless when the caller is at a public place where there is a chance of being overheard by an eavesdropper. In addition, pressing DTMF keys to enter secure information such as Social Security or credit card numbers runs the risk of a spy noting down the keys that are pressed, or using a remote camera to record the key press sequence. The spy could then use this information for fraudulent purposes, such as to hack a bank account. Thus, a user may not feel safe to verbalize confidential numbers or to type in the numbers on a phone in a public place.

By way of further background, U.S. Pat. No. 5,794,218 discloses a system and method for allowing telephone-based interactive performance of financial transactions in multiple languages. The system prompts the customer of a financial institution in various languages until the customer's language and home country are identified. The system then connects the customer telephonically with a representative who speaks the customer's language and who can authorize the transaction by accessing the customer's records. U.S. Pat. No. 6,847,715 discloses a system with an IVR unit, wherein an interaction input from a caller is stored and then transmitted to an appropriate agent workstation. An Internet banking service called ING Direct (http://www.ingdirect.com) provides its customers with a "phone like" dial pad image which is sent to a web client. The dial pad image associates a digit to a random set of alphabets. The user then looks at the image and inputs the corresponding alphabet instead of sending the digit itself over the network. This system, however, is only useful on a client computer.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

FIG. 4 is an exemplary script of a session between a user and an IVR system in accordance with one embodiment of the present invention.

DETAILED DESCRIPTION

Figure 1:
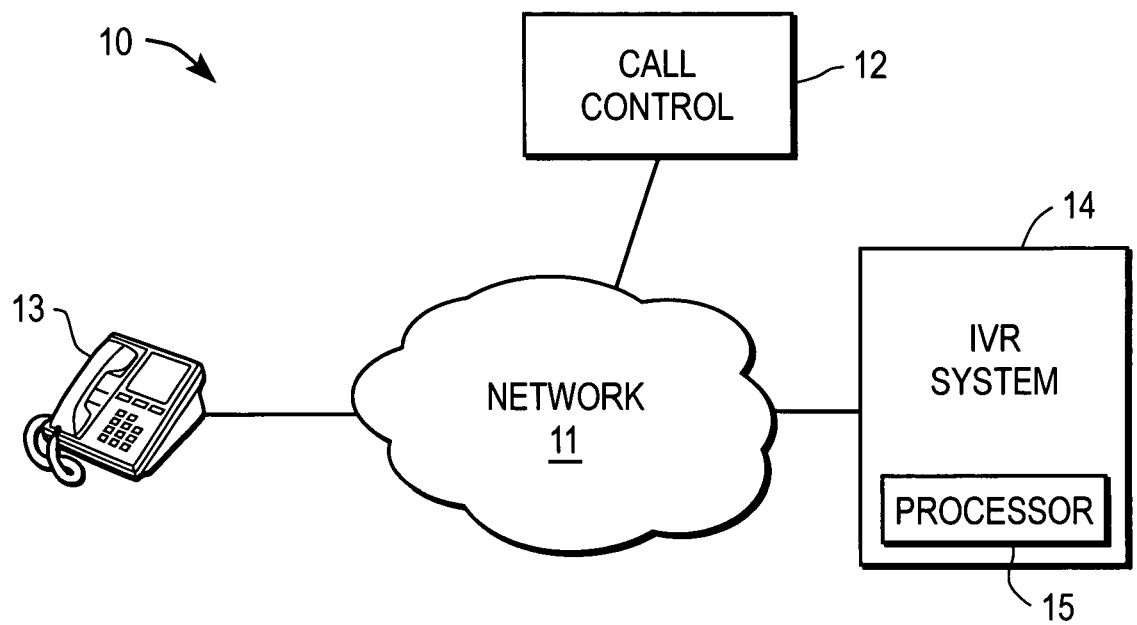
FIG. 1 is a network diagram that illustrates a security mechanism in accordance with one embodiment of the present invention.

A system and method that provides a user with the ability to transmit confidential information to an IVR system in a secure manner is described. In the following description specific details are set forth, such as device types, system configurations, protocols, methods, etc., in order to provide a thorough understanding of the present invention. However, persons having ordinary skill in the relevant arts will appreciate that these specific details may not be needed to practice the present invention.

According to one embodiment of the present invention, the system relies on a prompting mechanism, wherein the IVR reads out digits to the user and the user responds using "yes" or "no" as affirmative or negative responses to the IVR digits read out. Since the user does not press any DTMF keys or say anything other than "yes" or "no" it is impossible for listeners and/or observers to figure out what digits are being entered. When the IVR system requires the user to input digits, the user may opt to use this method of inputting digits to the system if the user is calling from a place where there is no privacy.

For example, if the user wants to enter the digits "1234", the IVR system may sequentially guess or suggest random numbers between 0 and 9 to the user, to which the user may individually respond "yes" or "no." Since the digits suggested may be randomly chosen each time, a person overhearing this conversation will be unable to discern or re-compute the digits that are being conveyed to the remote system. Various constructs may also be utilized by either the IVR system or the user. In other cases, the user might use a construct such as "8 less" when the IVR system makes an initial guess of "9" to send the first digit (i.e., "1") in the sequence "1234". In this manner, outside spies or eavesdroppers only hear "yes," "no," "8 less," "6 more", etc., without specific identification of the actual digits in the person's identification code or number.

In another embodiment, silence may replace the "no" responses. In this embodiment the user only responds when the correct digit is spoken by the IVR system, thereby reducing the number of affirmative verbal responses required from the user. Note that in a specific implementation the IVR system may optionally choose to confirm the digit being selected by repeating it and asking for an affirmative response.

Prompts from the IVR system may also be in a language other than English. For instance, in another embodiment the IVR system asks a user if they would like to respond in a language other than the predominant language of the region (e.g., English in the United States, German in Germany, etc.) or the default language programmed into the IVR system. This feature allows a user who speaks more than one language to respond in some language other than English (e.g., Japanese, French, Italian, Russian, etc.) that would not ordinarily be recognizable among the general population so that a casual listener overhearing the user would not likely be able to understand what digits the user is speaking.

The IVR system may also prompt the user to add a random number of digits in front and at the back of the actual sequence of digits. These digits may be provided by the system or may be randomly chosen by the user. For an even more secured transaction, the IVR system may also ask the user to insert a randomly chosen digit between each of the actual digits in a sequence. For example, during the session the IVR system may randomly request that the user speak certain "dummy" digits (e.g., "Please say the number '3' now") or ask the user to press certain digits on his DTMF keypad (e.g., "Please press the number '6' on your keypad now") as a way to confuse or further encrypt the user's actual identification number or secret code. These random dummy numbers may either be provided by the IVR system or may be selected by the user.

In another embodiment, the IVR system of the contact center or server application (that the user is calling for service) is not the entity that implements the digit prompting mechanism; rather, the caller's own telephone device implements the mechanism locally using hardware or software/firmware modules installed in the telephone device. For example, when the user wants to invoke the assisted DTMF mechanism described above, the user may speak a special trigger word or "hotword" such as "Assisted DTMF" into the telephone device. An automated speech recognition (ASR) module installed and running on the user's telephone device would recognize this hotword and respond my executing a program or routine that implements the assisted DTMF function locally. The assisted DTMF function basically replicates the function of the IVR system described above by verbally prompting the user to say the words "yes" or "no" to sequential numbers of the user's secret code to be transmitted.

Instead of speaking a hotword the user may press a keypad combination, such as "*6" or some other code sequence, in order to invoke the assisted DTMF telephone function. Once invoked, the telephone device executes its own IVR and suggests random numbers to the user, to which the user may respond "yes" or "no". After each digit has been correctly identified, the telephone device send the DTMF digit to the remote system in response to the "yes" or "no" answers of the user. Alternatively, the telephone device may store all of the digits in the entire sequence and send them in a single transmission after all of the digits have been correctly identified by the user.

In yet another embodiment, the interactive digit prompting mechanism may alternatively reside in a call control mechanism located on the network. For instance, an entity such as a Call Manager Media Termination Point (MTP), may be introduced into the media path when the hotword (spoken by the user) or code sequence command is detected. Once the hotword or code sequence command is detected, the Call Manager MTP invokes an IVR script or routine to provide assisted DTMF in the manner described above.

It is appreciated that the security mechanism of the present invention is also applicable to alpha-numeric sequences and codes; that is, it is not strictly limited to secure transmission of numbers or digits. For example, a user who wishes to enter a passcode "H32GX" may be prompted with an IVR script in which, for each character, the system first asks, "If the character is a number, say 'yes'; if the character is a letter say 'no'". Since, in this example, the first character is a letter, the user would say "no", in which case the IVR might respond "If the letter is after 'G' in the alphabet, say 'yes'; if not, say 'no'", and so on. Alternatively, the IVR script may simply ask, "Does the letter appear on the digit '4' of your keypad?"

Figure 3:
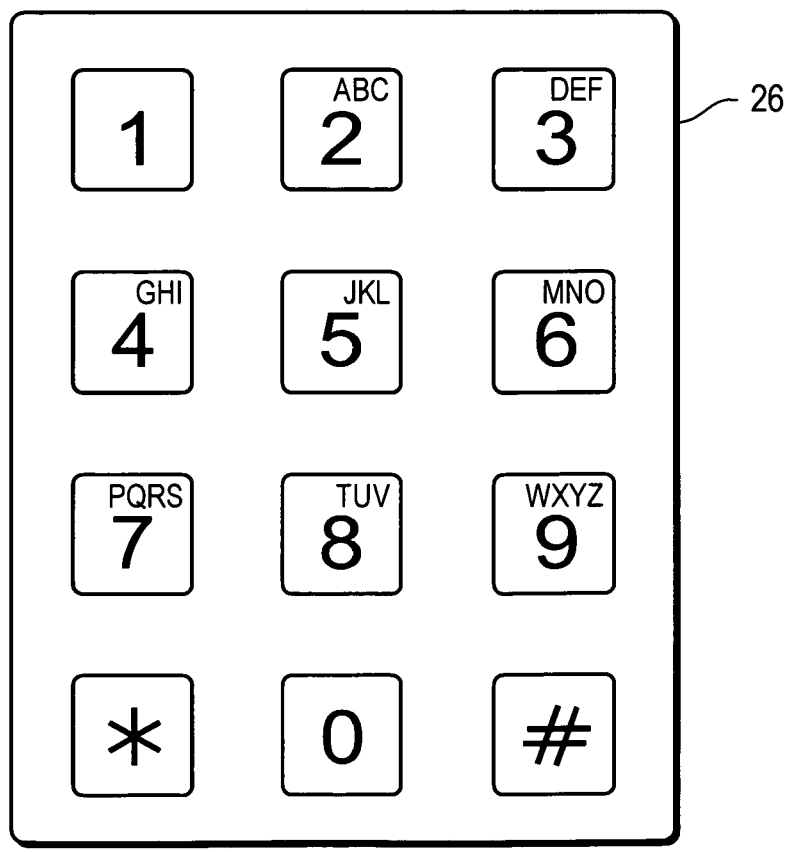
FIG. 3 is a DTMF key pad.

Practitioners in the art will note that the keypad associated with the digit 4 includes the letters GHI (see FIG. 3, which shows a DTMF keypad 26).

FIG. 1 is a network diagram that illustrates a security mechanism in accordance with one embodiment of the present invention in which a user telephone device 13 is shown connected to an IVR system 14 via a network 11. In general, telephone device 13 may comprise any one of a number of voice communication devices, including a desktop telephone such as a conventional voice-only telephone, a VoIP phone, or a wireless cellular telephone. It is appreciated that other types of communication electronic devices with voice capability may also be utilized. Basically, telephone device 13 may include any communication device capable of sending/receiving voice and/or data over a network. The network media path between telephone device 13 and IVR system 14 may include audio (voice), text, and even video transmissions over network 11 with connections that span across multiple services, systems, and devices (e.g., private branch exchange (PBX) systems, VoIP gateways, etc.). Network 11 may itself comprise a PSTN, ISDN, a time-division multiplexing (TDM)-based, a packet-network (e.g., VoIP)-based network, or any other network suitable for transmission of voice and data.

In a specific embodiment, the present invention may be implemented by software or hardware (firmware) installed in an ACD system of a call control center. For instance, the present invention may be implemented by code running on a processor 15 located in IVR system 14 on an ACD. Alternative embodiments of the present invention may be implemented in PBX, telephony, telephone, and other telecommunications systems.

Also shown in FIG. 1 is a call control module 12 connected with network 11. Call control module comprises an application or software "plug-in" embodied in a software module, a hardware/firmware module, or other computer product that includes executable code for performing the interactive digit prompting steps in connection with alternative embodiment described above. Call control module 12 may also include or be associated with a storage device (e.g., SRAM, EEPROM, hard disk, etc.) for storing IVR scripts and other information that can be used by a user to invoke an assisted DTMF function for securely transmitting security codes and other numerical or alpha-numerical sequences to a destination application, person, call center, or device over a network.

Figure 2:
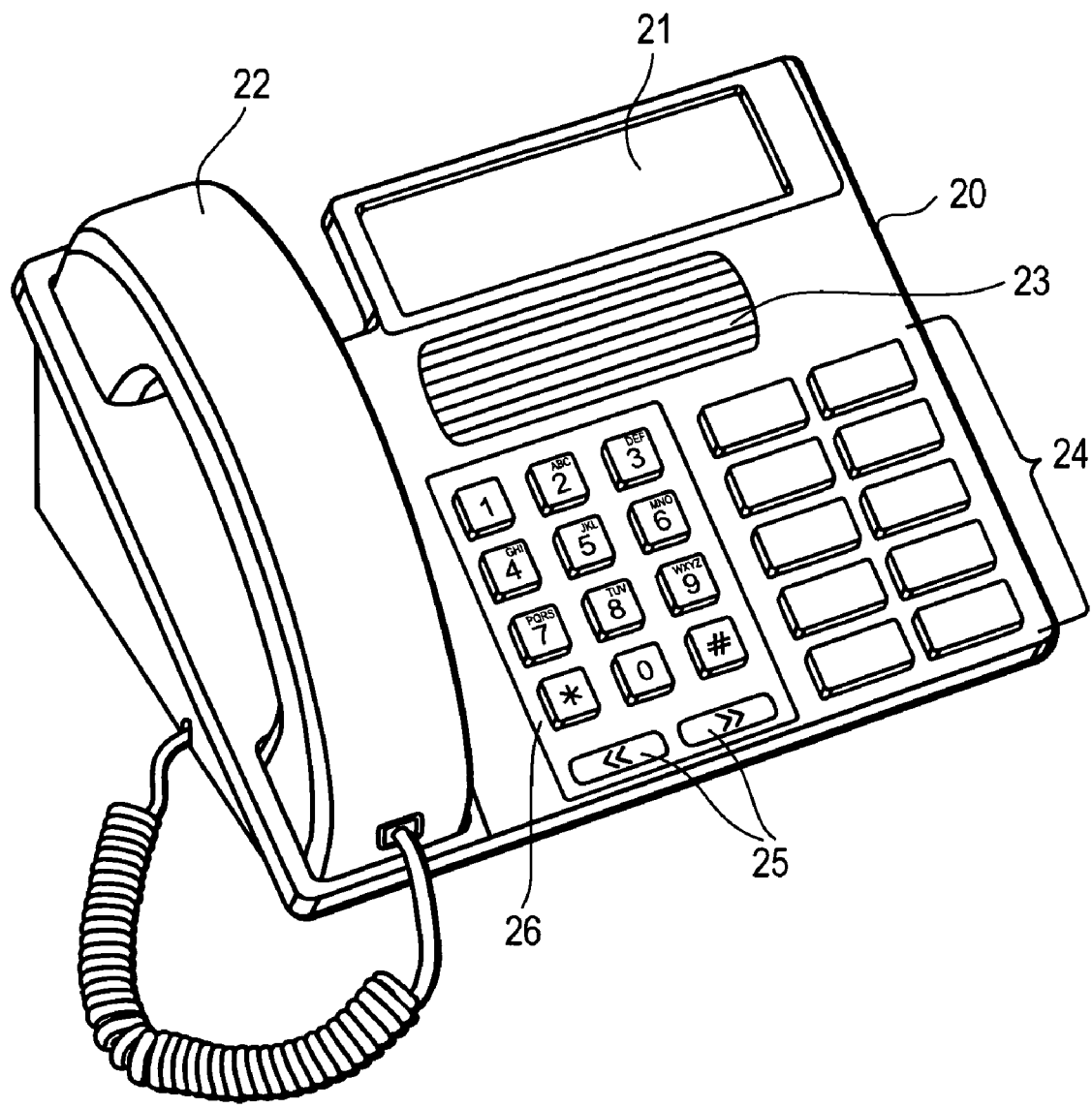
FIG. 2 is an example of a telephone device that may be utilized in accordance with one embodiment of the present invention.

FIG. 2 is a perspective view of a telephone device 20 that may be utilized by a person who dials into an application and who wishes to enter secure information in accordance with one embodiment of the present invention. Telephone device 20 includes a liquid crystal display (LCD) screen 21, a conferencing speaker 23, a DTMF (alphanumerical) keypad 26, volume control buttons 25, and a set of programmable function buttons 24 that may be programmed for functions such as speed dial, call forwarding, conference calls, voice messaging and the like. In one implementation, one of the function buttons 24 may be programmed for invoking the assisted DTMF function previously described.

According to one embodiment, a user of telephone device 20 may invoke the assisted DTMF security routine in a variety of ways (e.g., pressing one of buttons 24, speaking a "hotword", pressing a keypad sequence, etc.). At that point, a processor-executed routine resident within device 20 generates an IVR script to randomly suggest or guess at the individual numbers in the user's secret code or sequence. For example, the device might simply inquire if the first number in a sequence is "9." If the first number in the sequence is "9", the user could affirmatively respond by pressing the "*" button on keypad 26, or alternatively say the word "yes" into handset 22. If the first number in the sequence is not "9", the user could press the "#" button, or say the word "no".

After each number in the sequence is correctly identified by the security routine, it is transmitted to the destination recipient (e.g., application) over the network. Alternatively, telephone device 20 stores all of the digits and then transmits the entire sequence after the last digit has been identified.

FIG. 4 is an exemplary script of a session between a user and an IVR system in accordance with one embodiment of the present invention. When the IVR system requires the user to input digits, such as a credit card number, social security number, bank account number, etc., the IVR system may ask the user whether he wishes to enter his account/passcode information securely (e.g., "Do you want me to try to guess the digits of your number so you won't have to say them or press the buttons on your keypad?") In the case where the user is calling from a place where there is no privacy, he would reply, "Yes".

By way of example, in FIG. 4 the user wants to securely enter the last four digits of his social security number (e.g., 1639) to an online banking system. To start the process, the IVR system inquires if the first digit is "5" or less. The user answers "Yes." Narrowing down the choices, the IVR system then asks if the digit is "2" or more. The user answers "No." From there, the IVR system may simply begin guessing, e.g., it asks whether the number is "1". Since this is the correct answer, the user answers "yes." Note that up to this point, anyone within listening range of the user's conversation would have only heard, "Yes, yes, no, yes."

Now that it has determined that the first digit is "1", the IVR system then inquires about the second digit. Note that for each digit, the determination algorithm proceeds in the manner of a decision-tree process. Again, the IVR system begins the digit query by attempting to bracket the digit, e.g., asking the user if the second digit is "5" or less. Because the second number is the sequence is "6", the user answers "no." The query continues with the IVR system asking the user whether the second digit is "8" or less. This time the user answers "yes." Now the IVR system can begin guessing, and it asks, "Is it 6?" The user replies affirmatively, and the process continues until all four digits have been identified and transmitted to the destination. It is appreciated that since the digits suggested by the system are randomly chosen or suggested each time, a person overhearing the conversation cannot predictably re-compute the digits that are being conveyed to the remote application or system.

Figure 5:
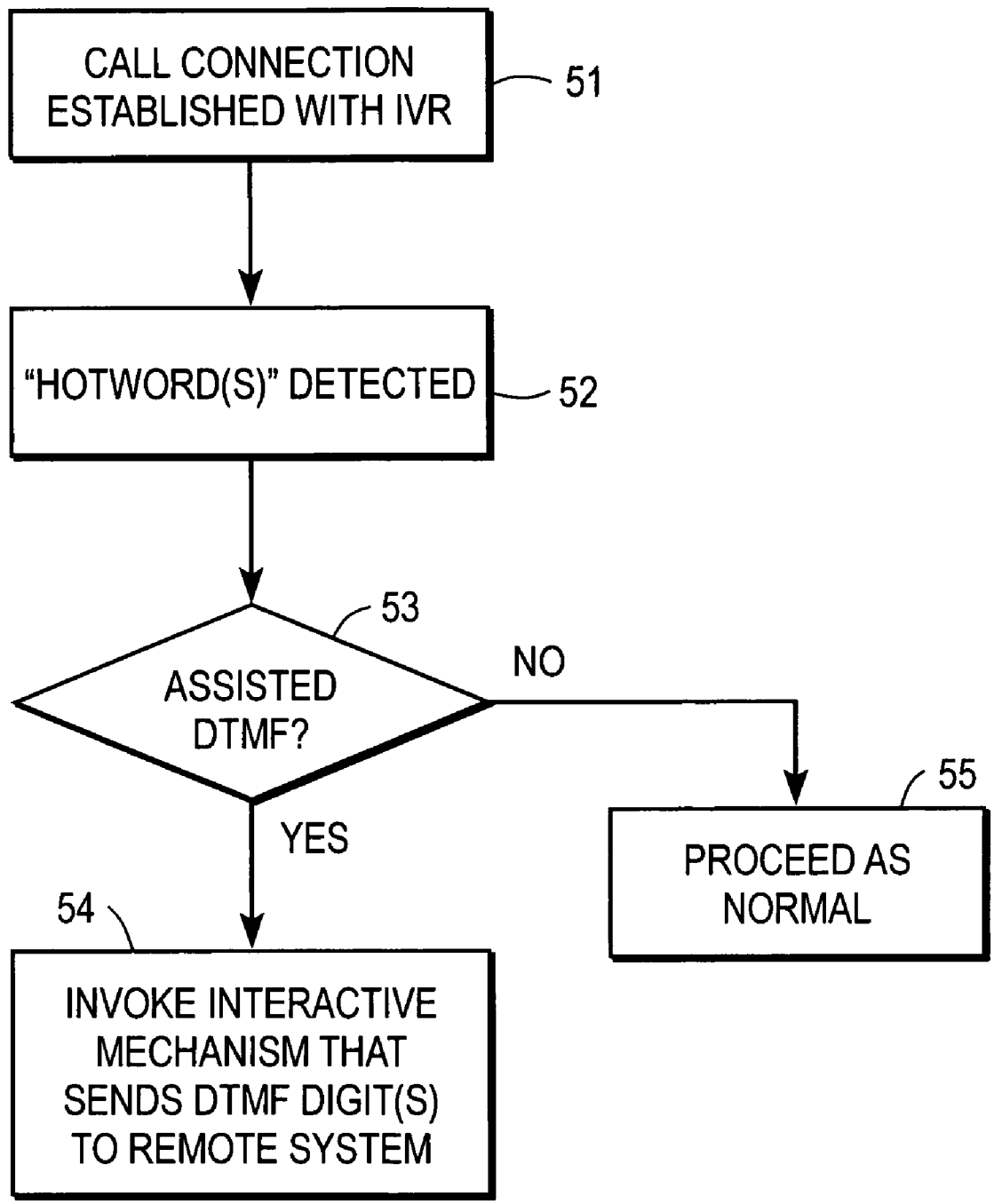
FIG. 5 is a flow chart illustrating another embodiment of the present invention.

FIG. 5 is a flow chart illustrating a method of operation in accordance with an assisted DTMF embodiment of the present invention. The process starts with a user establishing a call connection with a remote IVR system (block 51) through an endpoint device such as the telephone device described in FIG. 2. At some point during the IVR session the user wants to securely input a password or other secret numerical (or alphanumerical) sequence. In order to do so, he invokes the assisted DTMF function by articulating a "hotword" such as "assisted DTMF" to the system (block 52). To confirm that the user wants to invoke the assisted DTMF function or routine the IVR system sends a verbal query back to the user, "Assisted DTMF?" (block 53). The user may either reply "no", in which case the IVR system simply proceeds as normal (block 55); that is, before the hotword was detected, or the user may reply "yes". In the latter case, the IVR system invokes an interactive routine such as that described above in connection with FIG. 4 that determines the digits in the users sequence without having the user speak the digits or press corresponding buttons on the keypad of the phone. After determining one or more of the digits, the assisted DTMF routine then sends the digits to the remote system (block 54). As previously explained, the user's responses to the IVR queries may either be spoken ("yes" or "no") or manual keypad entries ("#" for "yes" or "*" for "no") by the user.

It should be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A non-transitory computer-readable storage medium encoded with a computer program for securely transmitting a sequence of digits across a network from a voice communication device to a destination system, when executed, the computer program operable to:

during a communication session, invoke an interactive voice response (IVR) routine for sequentially determining the digits in the sequence, for each digit the IVR routine making at least one digit guess or a query, a response by a user of the voice communication device to the at least one digit guess or the query indicating either a correct digit, an incorrect digit, or information to a digit guess or inquiry that narrows a range of possible remaining choices, the response being in a form that does not explicitly reveal a correct one of the digits in the sequence via spoken words or keypad entry to an eavesdropper who is able to discern the response, but not the at least one digit guess or the query of the IVR routine, the information being used by the IVR system as a basis for making at least one successive digit guess or another query until the correct digit has been determined; and once determined, send the sequence of digits to the destination system.

2. The non-transitory computer-readable storage medium of claim 1 wherein the digits in the sequence are sent to the destination system one at a time, each digit being sent once it has been determined by the IVR routine.

3. The non-transitory computer-readable storage medium of claim 1 wherein the information comprises a spoken construct.

4. The non-transitory computer-readable storage medium of claim 1 wherein the response by the user is a verbal response.

5. The non-transitory computer-readable storage medium of claim 4 herein the verbal response is either affirmative or negative.

6. The non-transitory computer-readable storage medium of claim 1 wherein the response by the user is a non-digit keypad button response.

7. The non-transitory computer-readable storage medium of claim 1 wherein the at least one digit guess or the query is randomly generated.

8. A non-transitory computer-readable storage medium encoded with a computer program for securely transmitting a sequence of digits across a network from a voice communication device to a destination system, when executed, the computer program operable to:
   during a communication session, invoke an interactive voice response (IVR) routine that includes successive queries or digit guesses for determining each of the digits in the sequence, the IVR routine being constructed such that a user of the voice communication device need only make an affirmative response or a negative response to each query or digit guess, the affirmative response or the negative response being in a form that does not explicitly reveal a correct one of the digits in the sequence via spoken words or keypad entry to an eavesdropper who is able to discern the affirmative or the negative response, but not the successive queries or digit guesses of the IVR routine; and
   once determined, send one or more of the digits to the destination system.

9. The non-transitory compute-readable storage medium of claim 8 wherein the digits are sent to the destination system one at a time, each digit being sent once it has been determined by the IVR routine.

10. The non-transitory computer-readable storage medium of claim 8 wherein the computer program, when executed, is further operable to respond to a spoken construct of the user.

11. The non-transitory computer-readable storage medium of claim 8 wherein the affirmative response and the negative response are both verbal responses.

12. The non-transitory computer-readable storage medium of claim 8 wherein the affirmative response comprises a first non-digit keypad button response and the negative response comprises a second non-digit keypad button response.

13. A processor-implemented method of securely transmitting a sequence of digits across a network from a voice communication device to a destination system, the method comprising:
   invoking an interactive voice response (IVR) routine, the IVR routine:
   determining each of the digits in the sequence by making successive queries or digit guesses, wherein a user of the voice communication device need only make an affirmative response or a negative response to each query or digit guess, the affirmative response or the negative response being in a form that does not explicitly reveal a correct one of the digits in the sequence via spoken words or keypad entry to an eavesdropper who is able to discern the affirmative or the negative response, but not the successive queries or digit guesses of the IVR routine; and
   once determined, sending each of the digits in the sequence to the destination system.

14. The processor-implemented method of claim 13 wherein the method further comprises responding, by the IVR routine, to a spoken construct of the user, the IVR routine making a new query or digit guess based on the spoken construct.

15. The processor-implemented method of claim 13 wherein invoking the IVR routine comprises speaking a trigger word into the voice communication device.

16. The processor-implemented method of claim 13 wherein the method further comprises randomly requesting that the user speak certain dummy digits.

17. The processor-implemented method of claim 13 wherein the affirmative and the negative responses both comprise verbal responses.

18. The processor-implemented method of claim 13 wherein the affirmative response comprises a first non-digit keypad button response and the negative response comprises a second non-digit keypad button response.

* * * * *